US007854986B2

(12) United States Patent
Oldorff

(10) Patent No.: US 7,854,986 B2
(45) Date of Patent: Dec. 21, 2010

(54) BUILDING BOARD AND METHOD FOR PRODUCTION

(75) Inventor: Frank Oldorff, Schwerin (DE)

(73) Assignee: Flooring Technologies Ltd., Pieta (MT)

( * ) Notice: Subject to any disclaimer, the term of this patent is extended or adjusted under 35 U.S.C. 154(b) by 676 days.

(21) Appl. No.: 11/470,839

(22) Filed: Sep. 7, 2006

(65) Prior Publication Data

US 2007/0207290 A1 Sep. 6, 2007

(30) Foreign Application Priority Data

Sep. 8, 2005 (DE) .................. 10 2005 042 657

(51) Int. Cl.
*B32B 27/00* (2006.01)
(52) U.S. Cl. .................. 428/212; 428/192; 428/411.1; 52/313
(58) Field of Classification Search ................ 428/212, 428/192, 411.1; 52/313
See application file for complete search history.

(56) References Cited

U.S. PATENT DOCUMENTS

| | | | |
|---|---|---|---|
| 213,740 A | 4/1879 | Conner |
| 623,562 A | 4/1899 | Rider |
| 714,987 A | 12/1902 | Wolfe |
| 753,791 A | 3/1904 | Fulghum |
| 1,124,228 A | 1/1915 | Houston |
| 1,407,679 A | 2/1922 | Ruthrauff |
| 1,454,250 A | 5/1923 | Parsons |
| 1,468,288 A | 9/1923 | Een |
| 1,477,813 A | 12/1923 | Daniels |
| 1,510,924 A | 10/1924 | Daniels et al. |
| 1,540,128 A | 6/1925 | Houston |
| 1,575,821 A | 3/1926 | Daniels |
| 1,602,256 A | 10/1926 | Sellin |
| 1,602,267 A | 10/1926 | Karwisch |
| 1,615,096 A | 1/1927 | Meyers |
| 1,622,103 A | 3/1927 | Fulton |
| 1,622,104 A | 3/1927 | Fulton |
| 1,637,634 A | 8/1927 | Carter |
| 1,644,710 A | 10/1927 | Crooks |
| 1,660,480 A | 2/1928 | Daniels |
| 1,714,738 A | 5/1929 | Smith |
| 1,718,702 A | 6/1929 | Pfiester |
| 1,734,826 A | 11/1929 | Pick |
| 1,764,331 A | 6/1930 | Moratz |
| 1,776,188 A | 9/1930 | Langb'aum |
| 1,778,069 A | 10/1930 | Fetz |
| 1,779,729 A | 10/1930 | Bruce |
| 1,787,027 A | 12/1930 | Wasleff |
| 1,823,039 A | 9/1931 | Gruner |
| 1,859,667 A | 5/1932 | Gruner |
| 1,898,364 A | 2/1933 | Gynn |
| 1,906,411 A | 5/1933 | Potvin |
| 1,921,164 A | 8/1933 | Lewis |
| 1,929,871 A | 10/1933 | Jones |
| 1,940,377 A | 12/1933 | Storm |
| 1,946,648 A | 2/1934 | Taylor |
| 1,953,306 A | 4/1934 | Moratz |
| 1,986,739 A | 1/1935 | Mitte |
| 1,988,201 A | 1/1935 | Hall |
| 2,023,066 A | 12/1935 | Curtis et al. |
| 2,044,216 A | 6/1936 | Klages |
| 2,065,525 A | 12/1936 | Hamilton |
| 2,123,409 A | 7/1938 | Elmendorf |
| 2,220,606 A | 11/1940 | Malarkey et al. |
| 2,276,071 A | 3/1942 | Scull |
| 2,280,071 A | 4/1942 | Hamilton |
| 2,324,628 A | 7/1943 | Kähr |
| 2,328,051 A | 8/1943 | Bull |
| 2,398,632 A | 4/1946 | Frost et al. |
| 2,430,200 A | 11/1947 | Wilson |
| 2,740,167 A | 4/1956 | Rowley |
| 2,894,292 A | 7/1959 | Gramelspacker |
| 3,045,294 A | 7/1962 | Livezey, Jr. |
| 3,100,556 A | 8/1963 | De Ridder |
| 3,125,138 A | 3/1964 | Bolenbach |
| 3,182,769 A | 5/1965 | De Ridder |
| 3,203,149 A | 8/1965 | Soddy |
| 3,204,380 A | 9/1965 | Smith et al. |
| 3,267,630 A | 8/1966 | Omholt |
| 3,282,010 A | 11/1966 | King, Jr. |
| 3,310,919 A | 3/1967 | Bue et al. |
| 3,347,048 A | 10/1967 | Brown et al. |
| 3,422,054 A * | 1/1969 | Kelly .......................... 524/779 |

(Continued)

FOREIGN PATENT DOCUMENTS

AT 005566 8/2002

(Continued)

OTHER PUBLICATIONS

European Search Report for corresponding European Application No. 06 01 7623, Nov. 2006.

(Continued)

*Primary Examiner*—David R Sample
*Assistant Examiner*—Lawrence D Ferguson
(74) *Attorney, Agent, or Firm*—Andrew M. Calderon; Roberts Mlotkowski Safran & Cole, P.C.

(57) ABSTRACT

A building board, in particular of wooden material, plastic or a mixture of wooden material and plastic, with a top side and an underside and side edges. A polyurethane layer is applied at least on the top side. A decorative layer imitating a natural material is applied onto the polyurethane layer.

19 Claims, 2 Drawing Sheets

U.S. PATENT DOCUMENTS

| | | | |
|---|---|---|---|
| 3,460,304 A | 8/1969 | Braeuninger et al. | |
| 3,481,810 A | 12/1969 | Waite | |
| 3,526,420 A | 9/1970 | Brancaleone | |
| 3,538,665 A | 11/1970 | Gohner | |
| 3,553,919 A | 1/1971 | Omholt | |
| 3,555,762 A | 1/1971 | Costanzo, Jr. | |
| 3,608,258 A | 9/1971 | Spratt | |
| 3,630,819 A * | 12/1971 | Conger | 428/160 |
| 3,694,983 A | 10/1972 | Couquet | |
| 3,714,747 A | 2/1973 | Curran | |
| 3,720,027 A | 3/1973 | Christensen | |
| 3,731,445 A | 5/1973 | Hoffmann et al. | |
| 3,759,007 A | 9/1973 | Thiele | |
| 3,760,548 A | 9/1973 | Sauer et al. | |
| 3,768,846 A | 10/1973 | Hensley et al. | |
| 3,859,000 A | 1/1975 | Webster | |
| 3,878,030 A | 4/1975 | Cook | |
| 3,890,415 A | 6/1975 | Hull | |
| 3,902,293 A | 9/1975 | Witt et al. | |
| 3,908,053 A | 9/1975 | Hettich | |
| 3,936,551 A | 2/1976 | Elmendorf et al. | |
| 3,988,187 A | 10/1976 | Witt et al. | |
| 4,006,048 A | 2/1977 | Cannady, Jr. et al. | |
| 4,090,338 A | 5/1978 | Bourgade | |
| 4,091,136 A | 5/1978 | O'Brian et al. | |
| 4,099,358 A | 7/1978 | Compaan | |
| 4,103,056 A | 7/1978 | Baratto et al. | |
| 4,118,533 A | 10/1978 | Hipchen et al. | |
| 4,131,705 A | 12/1978 | Kubinsky | |
| 4,164,832 A | 8/1979 | Van Zandt | |
| 4,169,688 A | 10/1979 | Toshio | |
| 4,242,390 A | 12/1980 | Nemeth | |
| 4,243,716 A | 1/1981 | Kosaka et al. | |
| 4,245,689 A | 1/1981 | Grard et al. | |
| 4,246,310 A | 1/1981 | Hunt et al. | |
| 4,290,248 A | 9/1981 | Kemerer et al. | |
| 4,299,070 A | 11/1981 | Oltmanns et al. | |
| 4,426,820 A | 1/1984 | Terbrack et al. | |
| 4,431,044 A | 2/1984 | Bruneau | |
| 4,471,012 A | 9/1984 | Maxwell | |
| 4,501,102 A | 2/1985 | Knowles | |
| 4,561,233 A | 12/1985 | Harter et al. | |
| 4,585,685 A | 4/1986 | Forry et al. | |
| 4,612,745 A | 9/1986 | Hovde | |
| 4,641,469 A | 2/1987 | Wood | |
| 4,653,242 A | 3/1987 | Ezard | |
| 4,654,244 A | 3/1987 | Eckert et al. | |
| 4,703,597 A | 11/1987 | Eggemar | |
| 4,715,162 A | 12/1987 | Brightwell | |
| 4,738,071 A | 4/1988 | Ezard | |
| 4,752,497 A | 6/1988 | McConkey et al. | |
| 4,769,963 A | 9/1988 | Meyerson | |
| 4,819,932 A | 4/1989 | Trotter, Jr. | |
| 4,831,806 A | 5/1989 | Niese et al. | |
| 4,845,907 A | 7/1989 | Meek | |
| 4,905,442 A | 3/1990 | Daniels | |
| 4,947,602 A | 8/1990 | Pollasky | |
| 5,029,425 A | 7/1991 | Bogataj | |
| 5,103,614 A | 4/1992 | Kawaguchi et al. | |
| 5,113,632 A | 5/1992 | Hanson | |
| 5,117,603 A | 6/1992 | Weintraub | |
| 5,136,823 A | 8/1992 | Pellegrino | |
| 5,165,816 A | 11/1992 | Parasin | |
| 5,179,812 A | 1/1993 | Hill | |
| 5,205,091 A | 4/1993 | Brown | |
| 5,216,861 A | 6/1993 | Meyerson | |
| 5,251,996 A | 10/1993 | Hiller et al. | |
| 5,253,464 A | 10/1993 | Nilsen | |
| 5,283,102 A | 2/1994 | Sweet et al. | |
| 5,295,341 A | 3/1994 | Kajiwara | |
| 5,335,473 A | 8/1994 | Chase | |
| 5,348,778 A | 9/1994 | Knipp et al. | |
| 5,349,796 A | 9/1994 | Meyerson | |
| 5,390,457 A | 2/1995 | Sjölander | |
| 5,413,834 A | 5/1995 | Hunter et al. | |
| 5,433,806 A | 7/1995 | Pasquali et al. | |
| 5,474,831 A | 12/1995 | Nystrom | |
| 5,497,589 A | 3/1996 | Porter | |
| 5,502,939 A | 4/1996 | Zadok et al. | |
| 5,540,025 A | 7/1996 | Takehara et al. | |
| 5,567,497 A | 10/1996 | Zegler et al. | |
| 5,570,554 A | 11/1996 | Searer | |
| 5,597,024 A | 1/1997 | Bolyard et al. | |
| 5,630,304 A | 5/1997 | Austin | |
| 5,653,099 A | 8/1997 | MacKenzie | |
| 5,671,575 A | 9/1997 | Wu | |
| 5,694,734 A | 12/1997 | Cercone et al. | |
| 5,706,621 A | 1/1998 | Pervan | |
| 5,736,227 A | 4/1998 | Sweet et al. | |
| 5,768,850 A | 6/1998 | Chen | |
| 5,797,175 A | 8/1998 | Schneider | |
| 5,797,237 A | 8/1998 | Finkell, Jr. | |
| 5,823,240 A | 10/1998 | Bolyard et al. | |
| 5,827,592 A | 10/1998 | Van Gulik et al. | |
| 5,860,267 A | 1/1999 | Pervan | |
| 5,935,668 A | 8/1999 | Smith | |
| 5,943,239 A | 8/1999 | Shamblin et al. | |
| 5,948,333 A | 9/1999 | Blackmon | |
| 5,953,878 A | 9/1999 | Johnson | |
| 5,968,625 A | 10/1999 | Hudson | |
| 5,985,397 A | 11/1999 | Witt et al. | |
| 5,987,839 A | 11/1999 | Hamar et al. | |
| 6,006,486 A | 12/1999 | Moriau et al. | |
| 6,023,907 A | 2/2000 | Pervan | |
| 6,065,262 A | 5/2000 | Motta | |
| 6,094,882 A | 8/2000 | Pervan | |
| 6,101,778 A | 8/2000 | Martensson | |
| 6,119,423 A | 9/2000 | Costantino | |
| 6,134,854 A | 10/2000 | Stanchfield | |
| 6,148,884 A | 11/2000 | Bolyard et al. | |
| 6,168,866 B1 | 1/2001 | Clark | |
| 6,182,410 B1 | 2/2001 | Pervan | |
| 6,186,703 B1 | 2/2001 | Shaw | |
| 6,205,639 B1 | 3/2001 | Pervan | |
| 6,209,278 B1 | 4/2001 | Tychsen | |
| 6,216,403 B1 | 4/2001 | Belbeoc'h | |
| 6,216,409 B1 | 4/2001 | Roy et al. | |
| D442,296 S | 5/2001 | Külik | |
| D442,297 S | 5/2001 | Külik | |
| D442,298 S | 5/2001 | Külik | |
| D442,706 S | 5/2001 | Külik | |
| D442,707 S | 5/2001 | Külik | |
| 6,224,698 B1 | 5/2001 | Endo | |
| 6,238,798 B1 | 5/2001 | Kang et al. | |
| 6,247,285 B1 | 6/2001 | Moebus | |
| D449,119 S | 10/2001 | Külik | |
| D449,391 S | 10/2001 | Külik | |
| D449,392 S | 10/2001 | Külik | |
| 6,315,300 B1 * | 11/2001 | Philipson | 277/523 |
| 6,324,803 B1 | 12/2001 | Pervan | |
| 6,345,481 B1 | 2/2002 | Nelson | |
| 6,363,677 B1 | 4/2002 | Chen et al. | |
| 6,397,547 B1 | 6/2002 | Martensson | |
| 6,418,683 B1 | 7/2002 | Martensson et al. | |
| 6,421,970 B1 | 7/2002 | Martensson et al. | |
| 6,427,408 B1 | 8/2002 | Krieger | |
| 6,436,159 B1 | 8/2002 | Safta et al. | |
| 6,438,919 B1 | 8/2002 | Knauseder | |
| 6,446,405 B1 | 9/2002 | Pervan | |
| 6,449,913 B1 | 9/2002 | Shelton | |
| 6,449,918 B1 | 9/2002 | Nelson | |
| 6,453,632 B1 | 9/2002 | Huang | |
| 6,458,232 B1 | 10/2002 | Valentinsson | |
| 6,460,306 B1 | 10/2002 | Nelson | |

| | | |
|---|---|---|
| 6,461,636 B1 | 10/2002 | Arth et al. |
| 6,465,046 B1 | 10/2002 | Hansson et al. |
| 6,490,836 B1 | 12/2002 | Moriau et al. |
| 6,497,961 B2 | 12/2002 | Kang et al. |
| 6,510,665 B2 | 1/2003 | Pervan |
| 6,516,579 B1 | 2/2003 | Pervan |
| 6,517,935 B1 | 2/2003 | Kornfalt et al. |
| 6,519,912 B1 | 2/2003 | Eckmann et al. |
| 6,521,314 B2 | 2/2003 | Tychsen |
| 6,532,709 B2 | 3/2003 | Pervan |
| 6,533,855 B1 | 3/2003 | Gaynor et al. |
| 6,536,178 B1 | 3/2003 | Pålsson et al. |
| 6,546,691 B2 | 4/2003 | Peopolder |
| 6,553,724 B1 | 4/2003 | Bigler |
| 6,558,754 B1 | 5/2003 | Velin et al. |
| 6,565,919 B1 | 5/2003 | Hansson et al. |
| 6,569,272 B2 | 5/2003 | Tychsen |
| 6,588,166 B2 | 7/2003 | Martensson et al. |
| 6,591,568 B1 | 7/2003 | Palsson |
| 6,601,359 B2 | 8/2003 | Olofsson |
| 6,606,834 B2 | 8/2003 | Martensson et al. |
| 6,617,009 B1 | 9/2003 | Chen et al. |
| 6,635,174 B1 | 10/2003 | Berg et al. |
| 6,641,629 B2 | 11/2003 | Safta et al. |
| 6,646,088 B2 | 11/2003 | Fan et al. |
| 6,647,690 B1 | 11/2003 | Martensson |
| 6,649,687 B1 | 11/2003 | Gheewala et al. |
| 6,659,097 B1 | 12/2003 | Houston |
| 6,672,030 B2 | 1/2004 | Schulte |
| 6,675,545 B2 | 1/2004 | Chen et al. |
| 6,681,820 B2 | 1/2004 | Olofsson |
| 6,682,254 B1 | 1/2004 | Olofsson et al. |
| 6,685,993 B1 | 2/2004 | Hansson et al. |
| 6,711,864 B2 | 3/2004 | Erwin |
| 6,711,869 B2 | 3/2004 | Tychsen |
| 6,715,253 B2 | 4/2004 | Pervan |
| 6,723,438 B2 | 4/2004 | Chang et al. |
| 6,729,091 B1 | 5/2004 | Martensson |
| 6,745,534 B2 | 6/2004 | Kornfalt |
| 6,761,008 B2 | 7/2004 | Chen et al. |
| 6,761,794 B2 | 7/2004 | Mott et al. |
| 6,763,643 B1 | 7/2004 | Martensson |
| 6,766,622 B1 | 7/2004 | Thiers |
| 6,769,217 B2 | 8/2004 | Nelson |
| 6,769,218 B2 | 8/2004 | Pervan |
| 6,769,835 B2 | 8/2004 | Stridsman |
| 6,772,568 B2 | 8/2004 | Thiers et al. |
| 6,786,019 B2 * | 9/2004 | Thiers ............... 52/589.1 |
| 6,803,109 B2 | 10/2004 | Qiu et al. |
| 6,805,951 B2 | 10/2004 | Kornfält et al. |
| 6,823,638 B2 | 11/2004 | Stanchfield |
| 6,841,023 B2 | 1/2005 | Mott |
| 2001/0029720 A1 | 10/2001 | Pervan |
| 2001/0034992 A1 | 11/2001 | Pletzer et al. |
| 2002/0007608 A1 | 1/2002 | Pervan |
| 2002/0007609 A1 | 1/2002 | Pervan |
| 2002/0014047 A1 | 2/2002 | Thiers |
| 2002/0020127 A1 | 2/2002 | Thiers et al. |
| 2002/0046528 A1 | 4/2002 | Pervan et al. |
| 2002/0056245 A1 | 5/2002 | Thiers |
| 2002/0100249 A1 | 8/2002 | Peng et al. |
| 2002/0106439 A1 | 8/2002 | Cappelle |
| 2002/0160680 A1 | 10/2002 | Laurence et al. |
| 2003/0024200 A1 | 2/2003 | Moriau et al. |
| 2003/0024201 A1 | 2/2003 | Moriau et al. |
| 2003/0029115 A1 | 2/2003 | Moriau et al. |
| 2003/0029116 A1 | 2/2003 | Moriau et al. |
| 2003/0029117 A1 | 2/2003 | Moriau et al. |
| 2003/0033777 A1 | 2/2003 | Thiers et al. |
| 2003/0033784 A1 | 2/2003 | Pervan |
| 2003/0115812 A1 | 6/2003 | Pervan |
| 2003/0115821 A1 | 6/2003 | Pervan |
| 2003/0159385 A1 | 8/2003 | Thiers |
| 2003/0167717 A1 | 9/2003 | Garcia |
| 2003/0196405 A1 | 10/2003 | Pervan |
| 2003/0205013 A1 | 11/2003 | Garcia |
| 2003/0233809 A1 | 12/2003 | Pervan |
| 2004/0016196 A1 | 1/2004 | Pervan |
| 2004/0035078 A1 | 2/2004 | Pervan |
| 2004/0092006 A1 | 5/2004 | Lindekens et al. |
| 2004/0105994 A1 | 6/2004 | Lu et al. |
| 2004/0139678 A1 | 7/2004 | Pervan |
| 2004/0159066 A1 | 8/2004 | Thiers et al. |
| 2004/0177584 A1 | 9/2004 | Pervan |
| 2004/0200165 A1 | 10/2004 | Garcia et al. |
| 2004/0206036 A1 | 10/2004 | Pervan |
| 2004/0237447 A1 | 12/2004 | Thiers et al. |
| 2004/0237448 A1 | 12/2004 | Thiers et al. |
| 2004/0241374 A1 | 12/2004 | Thiers et al. |
| 2004/0244322 A1 | 12/2004 | Thiers et al. |
| 2004/0250493 A1 | 12/2004 | Thiers et al. |
| 2004/0255541 A1 * | 12/2004 | Thiers et al. ............... 52/578 |
| 2004/0258907 A1 | 12/2004 | Kornfalt et al. |
| 2005/0003149 A1 | 1/2005 | Kornfalt et al. |
| 2005/0016099 A1 | 1/2005 | Thiers |

FOREIGN PATENT DOCUMENTS

| | | |
|---|---|---|
| AU | 713628 | 5/1998 |
| AU | 200020703 | 1/2000 |
| BE | 417526 | 9/1936 |
| BE | 557844 | 6/1957 |
| BE | 557844 | 3/1960 |
| BE | 09600527 | 6/1998 |
| BE | 09700344 | 10/1998 |
| CA | 991373 | 6/1976 |
| CA | 2226286 | 12/1987 |
| CA | 2252791 | 5/1999 |
| CA | 2289309 | 7/2000 |
| CH | 200949 | 1/1939 |
| CH | 211877 | 1/1941 |
| CH | 562377 | 5/1975 |
| DE | 314207 | 9/1919 |
| DE | 531989 | 8/1931 |
| DE | 740235 | 10/1943 |
| DE | 1089966 | 9/1960 |
| DE | 1534278 | 2/1966 |
| DE | 1212225 | 3/1966 |
| DE | 1212275 | 3/1966 |
| DE | 1534802 | 4/1970 |
| DE | 19 49 595 | 4/1971 |
| DE | 7102476 | 6/1971 |
| DE | 2007129 | 9/1971 |
| DE | 1534278 | 11/1971 |
| DE | 2252643 | 10/1972 |
| DE | 2238660 | 2/1974 |
| DE | 7402354 | 5/1974 |
| DE | 2502992 | 7/1976 |
| DE | 2616077 | 10/1977 |
| DE | 2917025 | 11/1980 |
| DE | 7911924 | 3/1981 |
| DE | 7928703 | 5/1981 |
| DE | 3041781 | 6/1982 |
| DE | 3214207 | 11/1982 |
| DE | 8226153 | 1/1983 |
| DE | 3343601 | 6/1985 |
| DE | 86040049 | 6/1986 |
| DE | 3512204 | 10/1986 |
| DE | 3246376 | 2/1987 |
| DE | 4004891 | 9/1990 |
| DE | 4002547 | 8/1991 |
| DE | 41 31 223 | 3/1992 |
| DE | 4134452 | 4/1993 |
| DE | 4215273 | 11/1993 |
| DE | 4242530 | 6/1994 |
| DE | 4011656 | 1/1995 |

| | | | | | | |
|---|---|---|---|---|---|---|
| DE | 4324137 | 1/1995 | | GB | 2243381 | 10/1991 |
| DE | 4107151 | 2/1995 | | GB | 2256023 | 11/1992 |
| DE | 29517128 | 2/1996 | | JP | 54-65528 | 5/1979 |
| DE | 4242530 | 9/1996 | | JP | 57-119056 | 7/1982 |
| DE | 3544845 | 12/1996 | | JP | 59-186336 | 10/1984 |
| DE | 29710175 | 9/1997 | | JP | 3-169967 | 7/1991 |
| DE | 19616510 | 3/1998 | | JP | 4-106264 | 4/1992 |
| DE | 19651149 | 6/1998 | | JP | 5-148984 | 6/1993 |
| DE | 19709641 | 9/1998 | | JP | 6-56310 | 5/1994 |
| DE | 19718319 | 11/1998 | | JP | 6-146553 | 5/1994 |
| DE | 19735189 | 6/2000 | | JP | 6-200611 | 7/1994 |
| DE | 20001225 | 8/2000 | | JP | 6-320510 | 11/1994 |
| DE | 19925248 | 12/2000 | | JP | 7-76923 | 3/1995 |
| DE | 20017461 | 3/2001 | | JP | 7-180333 | 7/1995 |
| DE | 20019284 | 3/2001 | | JP | 7-300979 | 11/1995 |
| DE | 20206460 | 8/2002 | | JP | 7-310426 | 11/1995 |
| DE | 20218331 | 5/2004 | | JP | 8-109734 | 4/1996 |
| EP | 0248127 | 12/1987 | | JP | 8-270193 | 10/1996 |
| EP | 0623724 | 11/1994 | | JP | 09085905 A * | 3/1997 |
| EP | 0652340 | 5/1995 | | JP | 11277508 A * | 10/1999 |
| EP | 0667936 | 8/1995 | | JP | 2003053892 A * | 2/2003 |
| EP | 0690185 | 1/1996 | | NE | 7601773 | 2/1976 |
| EP | 0849416 | 6/1998 | | NO | 157871 | 2/1988 |
| EP | 0698162 | 9/1998 | | NO | 305614 | 6/1999 |
| EP | 0903451 | 3/1999 | | RU | 363795 | 12/1972 |
| EP | 0855482 | 12/1999 | | SE | 7114900-9 | 9/1974 |
| EP | 0877130 | 1/2000 | | SE | 450411 | 6/1987 |
| EP | 0969163 | 1/2000 | | SE | 450141 | 9/1987 |
| EP | 0969164 | 1/2000 | | SE | 501014 | 10/1994 |
| EP | 0974713 | 1/2000 | | SE | 501914 | 6/1995 |
| EP | 0843763 | 10/2000 | | SE | 502994 | 4/1996 |
| EP | 1 099 736 | 5/2001 | | SE | 506254 | 11/1997 |
| EP | 1200690 | 5/2002 | | SE | 509059 | 11/1998 |
| EP | 0958441 | 7/2003 | | SE | 509060 | 11/1998 |
| EP | 1026341 | 8/2003 | | SE | 512290 | 2/2000 |
| ES | 163421 | 9/1968 | | SE | 512313 | 2/2000 |
| ES | 460194 | 5/1978 | | SE | 0000200-6 | 8/2001 |
| ES | 283331 | 5/1985 | | WO | 84/02155 | 6/1984 |
| ES | 1019585 | 12/1991 | | WO | 87/03839 | 7/1987 |
| ES | 1019585 | 4/1992 | | WO | 89/08539 | 9/1989 |
| ES | 2168045 | 5/2002 | | WO | 92/17657 | 10/1992 |
| FI | 843060 | 8/1984 | | WO | 93/13280 | 7/1993 |
| FR | 1293043 | 4/1962 | | WO | 93/19910 | 10/1993 |
| FR | 2691491 | 11/1983 | | WO | 94/01628 | 1/1994 |
| FR | 2568295 | 5/1986 | | WO | 94/26999 | 11/1994 |
| FR | 2623544 | 5/1989 | | WO | 9426999 | 11/1994 |
| FR | 2630149 | 10/1989 | | WO | 95/06176 | 3/1995 |
| FR | 2637932 | 4/1990 | | WO | 96/27719 | 9/1996 |
| FR | 2675174 | 10/1991 | | WO | 96/27721 | 9/1996 |
| FR | 2667639 | 4/1992 | | WO | 96/30177 | 10/1996 |
| FR | 2691491 | 11/1993 | | WO | 97/47834 | 12/1997 |
| FR | 2697275 | 4/1994 | | WO | 98/24495 | 6/1998 |
| FR | 2712329 | 5/1995 | | WO | 98/24994 | 6/1998 |
| FR | 2776956 | 10/1999 | | WO | 98/38401 | 9/1998 |
| FR | 2781513 | 1/2000 | | WO | 9940273 | 8/1999 |
| FR | 2785633 | 5/2000 | | WO | 99/66151 | 12/1999 |
| GB | 424057 | 2/1935 | | WO | 9966152 | 12/1999 |
| GB | 585205 | 1/1947 | | WO | 0006854 | 2/2000 |
| GB | 599793 | 3/1948 | | WO | 0066856 | 11/2000 |
| GB | 636423 | 4/1950 | | WO | 0166876 | 9/2001 |
| GB | 812671 | 4/1959 | | WO | WO 2004067874 A2 * | 8/2004 |
| GB | 1033866 | 6/1966 | | WO | WO 2004098881 A1 * | 11/2004 |
| GB | 1034117 | 6/1966 | | | | |
| GB | 1044846 | 10/1966 | | | | |
| GB | 1237744 | 6/1968 | | | | |
| GB | 1127915 | 9/1968 | | | | |
| GB | 1275511 | 5/1972 | | | | |
| GB | 1399402 | 7/1975 | | | | |
| GB | 1430423 | 3/1976 | | | | |
| GB | 2117813 | 10/1983 | | | | |
| GB | 2126106 | 3/1984 | | | | |
| GB | 2152063 | 7/1985 | | | | |
| GB | 2238660 | 6/1991 | | | | |

OTHER PUBLICATIONS

Webster Dictionary, p. 862.
Opposition II EPO. 698. 162—Facts—Arguments Evidence (11 pages)—translation.
U.S. Court of Appeals for the Federal Circuit, 02-1222-1291 *Alloc, Inc.* vs. *International Trade Commission*, pp. 1-32, Sep. 2003.
U.S. Court of Appeals for the Federal Circuit Decision in *Alloc, Inc. et al.* vs. *International Trade Commission and Pergs, Inc. et al.* decided Sep. 10, 2003.

* cited by examiner

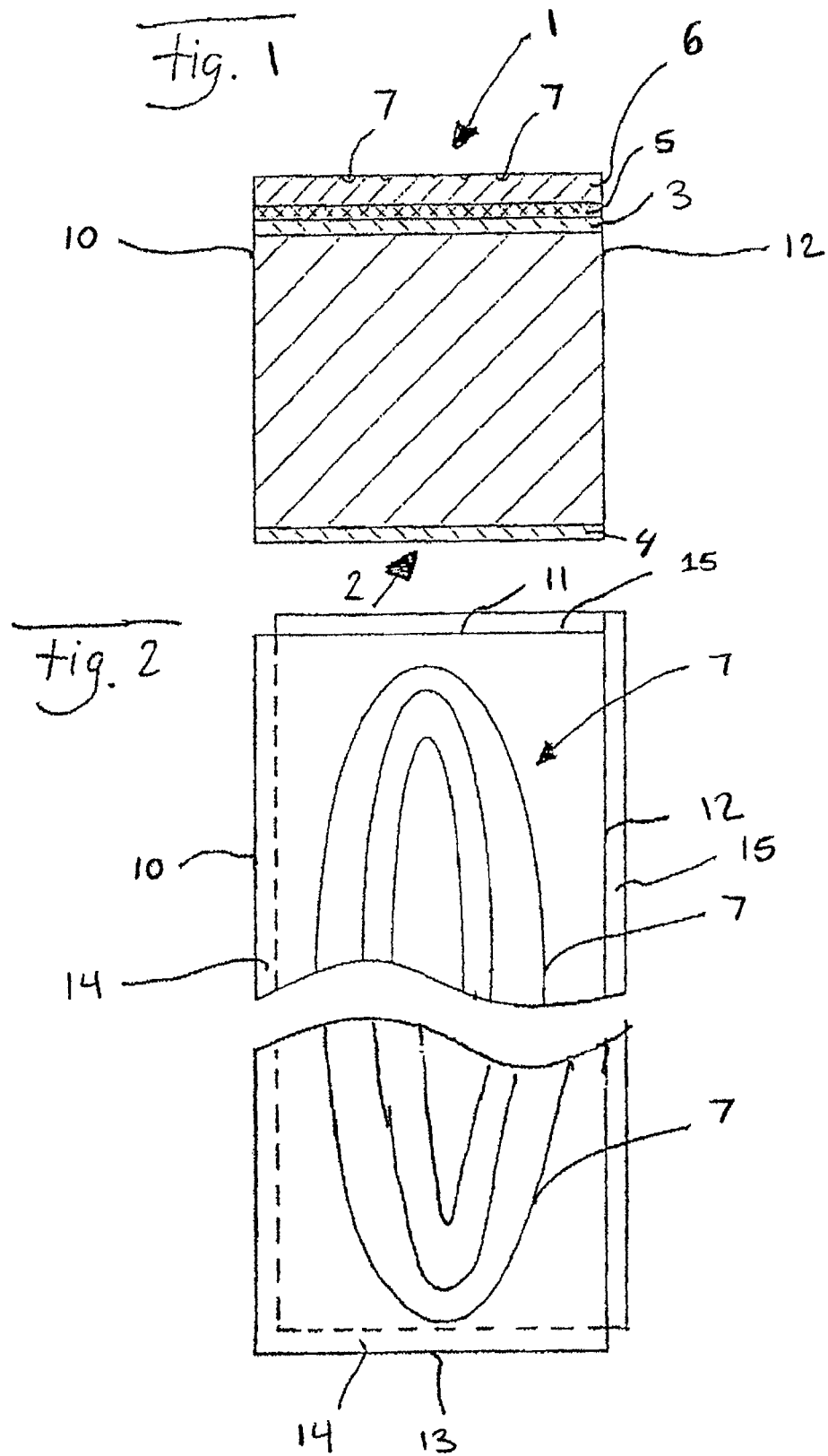

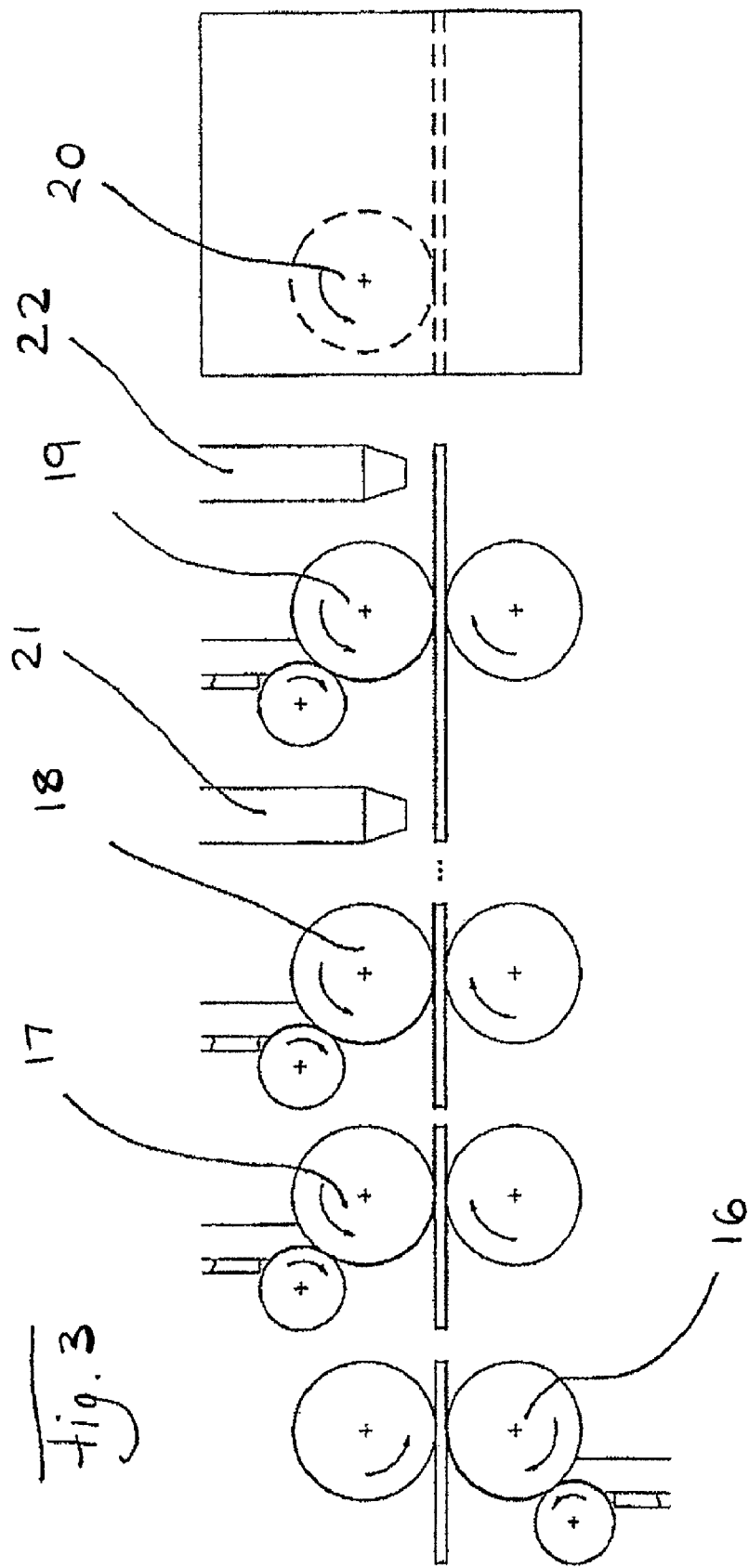

BUILDING BOARD AND METHOD FOR PRODUCTION

CROSS-REFERENCE TO RELATED APPLICATIONS

The present application claims priority under 35 U.S.C. §119 of German Patent Application No. 10 2005 042 657.3, filed on Sep. 8, 2005, the disclosure of which is expressly incorporated by reference herein in its entirety.

BACKGROUND OF THE INVENTION

1. Field of the Invention

The invention relates to a building board and, in particular, a flooring panel of wooden material, plastic or a mixture of wooden material and plastic, with a top side and an underside and side edges, for which a polyurethane layer is applied at least on the top side.

2. Discussion of Background Information

Known flooring panels are based largely on wooden material bodies of HDF, MDF or OSB. Panels of this type have disadvantages, since wooden materials have hygroscopic properties, whereby changes in the size of the wooden materials result from swelling and shrinking. As such, floor panels of this type cannot be used in wet rooms.

In addition, flooring panels are often provided with hard, wear-resistant surfaces which produce bothersome noises when walked on and counteract the natural effect that laminate floors are intended to produce.

Flooring panels with a base material made of water-resistant material, e.g., plastic, are also known. However, such plastic materials cannot be impressed with resin-impregnated decorative and overlay papers under increased pressure and under increased temperature.

Laminates are also known, onto the plate-like basis of which at least one paper layer bearing a pattern is applied. The pattern imitates in look and feel a natural material, such as, e.g., wood or stone. To this end, the pattern can also have an embossed structure. The cost-intensive production through the use of decorated and impregnated paper layers and their precise alignment on the plate-like base and their precise alignment with respect to a tool applying the embossed structure are disadvantages. The control of the pressure and temperature conditions and the control of the process speed are also cost-intensive.

In known panels, the imitated decoration is printed on a paper web that is subsequently coated with synthetic resin and rolled up on a roll. The prefabricated decorative web is subsequently applied onto wood fiber boards at the panel manufacturer. However, the dimensions of the paper web change through the printing of the pattern onto the paper web, the subsequent sealing of the paper web with synthetic resin and the subsequent joining of the decorative layer to the wooden material board through the effect of pressure and temperature. This is known by those of skill in the art as paper growing. The paper grows both in length (length growth) and in width (width growth).

If the decorative board is cut to size to form individual panels, the length and width growth must be taken into account, since otherwise there would be an unequal distribution of the pattern on the individual panels. The consequence of this would be that the floor composed of an unequally distributed decorative layer would have jumps (e.g., not align) in the pattern at the joining edges of the panels. Even if such jumps in the pattern amount only to a few millimeters, they stand out when viewed, which has a detrimental effect on the aesthetic impression and therefore reduces the quality of the laid floor. In order to be able to produce floors with a suitable quality, the paper growth must be registered and the cutting mechanism (e.g., saw) must be adjusted appropriately, which makes the production of the panels even more expensive.

SUMMARY OF THE INVENTION

Based on these problems, the present invention is directed to building boards that imitate natural materials almost perfectly and, in addition, can be used in wet rooms. Furthermore, the properties regarding noise formation when walked on are improved. Moreover, a simplified and cost-effective method for producing the building boards is provided.

To solve the above-noted problems, the building board has a decorative layer, imitating a natural material, applied onto a polyurethane layer. The method for producing a building board includes applying a decorative layer, imitating a natural material, onto the polyurethane layer.

The building board can have a first polyurethane layer on the underside as well as on the top side. Advantageously, the polyurethane layer on the underside serves as a so-called counteracting layer to avoid a bowing of the building board. Moreover, the polyurethane layer on the underside, since it is elastic, can also be used as a sound-proofing layer.

In order to further improve the sound-proofing properties of the polyurethane layer, the polyurethane layer on the underside can contain additions of particles heavier than the polyurethane such as sand, flour or dusts of quartz, granite or marble or metal particles.

The polyurethane layer on the underside can further contain colored particles in order to meet different requirements for the optical design of the building board. The development of noise when the building board is walked on can be advantageously reduced through the elastic polyurethane layer on the top side. In addition, the polyurethane layer on the top side seals the building board from penetration by moisture, so that it can also be used in wet rooms.

Furthermore, the polyurethane layer on the top side serves as an undercoat and/or as an adhesion promoter for a subsequent decorative layer comprising one or more individual layers. Through this the application of a decorative paper impregnated with resin is no longer necessary, resulting in substantial cost-saving potential for the production of building boards.

Depending on how thickly the decorative layer is to be applied to the polyurethane layer, the decorative layer can comprise one or more individual layers so as to be able to realize even complex patterns.

A sealing polyurethane layer is preferably applied onto the decorative layer in order to protect the decorative layer, e.g., from mechanical impact from being walked on and from damage from the effects of moisture. So that the building board can imitate a natural material with particular exactness, the top polyurethane layer can have a structural embossing that is matched, e.g., to a wood pattern to be imitated of the decorative layer. Advantageously the applied amount of the sealing polyurethane layer is between about 50 to 400 $g/m^2$ and more preferably about 50 to 100 $g/m^2$ for weak or light embossing and between about 100 to 400 $g/m^2$ for heavy embossing.

In order to further improve the abrasion resistance of the sealing polyurethane layer, corundum can be added to the sealing polyurethane layer as wear-resistant particles. The sealing polyurethane layer can contain effect-producing particles such as metal or colored pigments in order to be able to meet different requirements for the optical design. The uppermost polyurethane layer can thus, e.g., also be single-colored.

Optionally, or in combination with the above-mentioned variants, the sealing polyurethane layer can contain additions with an optically brightening effect or also with an antistatic effect. The invention also contemplates additions with an antibacterial and/or dirt-repellent effect to be added to the sealing polyurethane layer in order to be able to produce from the building boards, e.g., flooring for special applications with higher demands in terms of hygiene. Advantageously, through the variation of the composition of the polyurethane layer(s), the degree of shine of the surface can be adjusted in order also to meet the different optical demands of the various applications.

Alternatively, both the underside as well as the top side of the building board can be given an identical layer structure. In addition to effects in terms of look and feel, a structuring embossing on the underside has an antiskid effect on the substrate. The impression of an almost perfect imitation of a natural material, e.g., wood or stone, can be further intensified through the decorative layer and structuring on the underside and the top side.

Advantageously, connecting mechanisms corresponding to one another, e.g., tongue and groove, are formed on the side edges of the building board in order to connect a plurality of building boards to one another. It is particularly advantageous if mechanical locking mechanisms for locking several building boards to one another are formed on the connecting mechanism so that, in addition to the connection of a plurality of building boards to one another, a mechanical locking of the building boards without additional gluing is also possible.

In order to imitate a natural material, e.g., wood or stone, with particular exactness it is advantageous to apply a decorative layer imitating the respective natural material onto the edges of the building board. In order to simulate the material to be imitated even more exactly it is advantageous to also emboss a structuring embossing imitating the respective natural material into the sealing polyurethane layer of the side edges of the building board. Preferably the decorative layer and/or the structuring embossing are matched to the pattern located on the top side.

The method for producing a building board includes a decorative layer imitating a natural material being applied onto a polyurethane layer. Advantageously, the polyurethane layer can be applied by pouring on and smoothing with a doctor's blade so that an even surface is produced on the top side of the building board provided with a decorative layer.

The decorative layer that is applied onto the polyurethane layer can also be applied by one or more rolling mills in order to be able to apply different colors or multi-layer patterns onto the surface of the building board.

Alternatively, the decorative layer can also be applied by at least one digital printer or printed in the screen printing process. Through the various possibilities of applying the decorative layer to the top side of the building board, it is possible to be responsive to the respective plant-specific prerequisites.

Depending on the optical requirements, the decorative layer can be applied in one layer or in several layers. If the decorative layer is applied in several layers, it is possible to produce by means of the decorative layer itself a relief-like surface that can imitate a natural surface, e.g., a wood surface, with particular exactness.

Advantageously, a sealing polyurethane layer is applied to the decorative layer in order to protect the decorative layer from abrasion and other mechanical influences and to improve the sound-proofing properties of the building board.

In order to make the application of the sealing polyurethane layer particularly simple, the application can be made by a roller printing machine. Alternatively, the invention contemplates applying the sealing polyurethane layer by pouring on and smoothing with a doctor's blade. It has been shown that it is advantageous to apply the sealing polyurethane layer in at least one or more layers. A thick or particularly thin sealing polyurethane layer adapted to the respective requirements can be applied. The drying of the respective last sealing polyurethane layer can occur between the application of the individual polyurethane layers in order to render the multi-layer structure of the sealing polyurethane layer and also to realize particularly thick polyurethane layers in which particularly deep embossing can be made.

The drying process can occur actively, e.g., through a heater fan, or also passively, e.g., through airing in the ambient air.

The division of a large building board into several individual small building boards can be made by means of one of several dividing saws. Alternatively, other dividing methods, e.g., water jet cutting, can also be used.

Optionally, a further treatment of the edges can be provided. The edges can be at least partially decorated and/or be given a structuring embossing. Preferably the decoration and/or the structuring embossing are the same as the pattern located on the surface. The impression of a perfect imitation of a natural material can thereby be intensified even further.

The method includes applying a polyurethane layer by pouring on and smoothing with a doctor's blade or by one or more rolling mills. The method further comprises applying at least two layers of polyurethane layer and drying at least the last layer of the polyurethane layer by a heater fan and/or through airing in ambient air. The decorative layer is applied by at least one digital printer or printed in a screen printing process. The decorative layer is applied in one layer or in several layers. When the decorative layer is applied in several layers, the decorative layer itself provides a relief-like surface imitating a natural surface. The polyurethane layer can be applied to the underside. The method further comprises applying a second polyurethane layer after the decorative layer is dried and, prior to drying the polyurethane layer, applying a structuring embossing. The method further includes at least partially providing a decoration and/or structuring embossing on side edges of the building board. The structuring embossing on side edges of the building board matches a structure embossing on the top side.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 1 is a cross section of the building board in accordance with the invention;

FIG. 2 is a plan view of the building board in accordance with the invention; and FIG. 3 shows a process diagram for producing the building board in accordance with the invention.

DETAILED DESCRIPTION OF THE PRESENT INVENTION

The particulars shown herein are by way of example and for purposes of illustrative discussion of the embodiments of the invention only and are presented in the cause of providing what is believed to be the most useful and readily understood description of the principles and conceptual aspects of the invention. In this regard, no attempt is made to show structural details of the invention in more detail than is necessary for the fundamental understanding of the present invention, the description taken with the drawings making apparent to those skilled in the art how the several forms of the invention may be embodied in practice.

FIG. 1 shows a cross section of the building board with a top side 1 and an underside 2. A polyurethane layer 3 is applied onto the top side 1 as an undercoat and adhesion promoter. The development of noise when the building board is walked on can be advantageously reduced through the elastic polyurethane layer on the top side. In addition, the polyurethane layer on the top side seals the building board from penetration by moisture, so that it can also be used in wet rooms.

A polyurethane layer 4 is applied to the underside 2 as a counteracting layer. The polyurethane layer 4 on the underside can contain colored particles in order to meet different requirements for the optical design of the building board. A decorative layer 5 is applied onto the polyurethane layer 3. In embodiments, the decorative layer has a pattern imitating a natural material.

A sealing polyurethane layer 6 is applied onto the decorative layer 5. In embodiments, the sealing polyurethane layer 6 is thicker than the first polyurethane layer 3 and is composed of several layers. The applied amount of the sealing polyurethane layer 6 is between about 50 to 400 g/m² and more preferably about between 50 to 100 g/m² for weak or light embossing and between 100 to 400 g/m² for heavy embossing. In order to further improve the abrasion resistance of the sealing polyurethane layer 6, corundum can be added to the sealing polyurethane layer 6 as wear-resistant particles. The sealing polyurethane layer 6 can contain effect-producing particles such as metal or colored pigments. The sealing polyurethane layer 6 can be single-colored. Optionally, or in combination with the above-mentioned variants, the sealing polyurethane layer 6 can contain additions with an optically brightening effect or also with an antistatic effect. The invention also contemplates additions with an antibacterial and/or dirt-repellent effect to be added to the sealing polyurethane layer 6 in order to be able to produce from the building boards, e.g., flooring for special applications with higher demands in terms of hygiene.

A structuring embossing 7 is made in the surface of the sealing polyurethane layer 6 by means of a roller printing machine 17 (see, FIG. 3), which embossing imitates a natural material and is adapted to (e.g., is the same) the structure of the decorative layer 5. Both the underside 2 as well as the top side 1 of the building board can be given an identical layer structure. In addition to effects in terms of look and feel, a structuring embossing on the underside 2 has an antiskid effect. Preferably the decorative layer 5 and/or the structuring embossing 7 are matched to the pattern located on the top side 1.

FIG. 2 shows a plan view of the top side 1 of the building board. As previously discussed, the decorative layer 5 and a sealing polyurethane layer 6 are applied onto the first polyurethane layer 3. As shown in FIG. 2, structuring embossing 7 are embossed into the sealing polyurethane layer 6. The embossing imitates a natural material, in this case a wood structure. Grooves 14, as connecting mechanisms, are formed on the side edges 10 and 13. Tongues 15, e.g., corresponding connecting mechanisms, are formed on the opposite side edges 11 and 12.

The method for producing a building board includes a decorative layer 5 imitating a natural material being applied onto a polyurethane layer 3. The polyurethane layer 3 (and layer 4 and/or sealing polyurethane layer 6) can be applied by pouring on and smoothing with a doctor's blade so that an even surface is produced on the top side 1 of the building board provided with the decorative layer 5. The drying process can occur actively, e.g., through a heater fan, or also passively, e.g., through airing in the ambient air.

The decorative layer 5 that is applied onto the polyurethane layer 3 can also be applied by one or more rolling mills in order to be able to apply different colors or multi-layer patterns onto the surface of the building board. Alternatively, the decorative layer 5 can be applied by at least one digital printer or printed in the screen printing process. Depending on the optical requirements, the decorative layer 5 can be applied in one layer or in several layers. If the decorative layer 5 is applied in several layers, it is possible to produce by means of the decorative layer 5 itself a relief-like surface that can imitate a natural surface, e.g., a wood surface, with particular exactness. The sealing polyurethane layer 6 can be applied over the decorative layer, in one or more layers. The drying of the respective last polyurethane layer can occur between the application of the individual polyurethane layers in order to render possible the multi-layer structure of the sealing polyurethane layer and also to realize particularly thick polyurethane layers in which particularly deep embossing can be made.

More specifically, FIG. 3 shows a device for producing the building board. As shown, the polyurethane layer 4 is applied by means of the roller printer machine 16 to the underside 2 of the building board as a counteracting layer to prevent bowing. After the polyurethane layer 4 has dried, the application of a polyurethane layer 3 as an undercoat and adhesion promoter to the top side 1 of the building board takes place by means of the roller printing machine 17. The decorative layer 5, imitating a natural material, is applied onto the polyurethane layer 3 by means of the rolling mill 18. After the active drying of the decorative layer by means of the drying device 21, for example, the application takes place of the second polyurethane layer 5 by means of the roller printing machine 19. The sealing polyurethane layer 6 is dried by means of a drying device 22. Finally, before the curing of the polyurethane layer 6, a structuring embossing 7 is embossed by the embossing tool 20 in order to further intensify the natural impression of the building board.

The division of a large building board into several individual small building boards can be made by means of one of several dividing saws. Alternatively, other dividing methods, e.g., water jet cutting, can also be used. Optionally, a further treatment of the edges can include, for example, at least partially providing a decoration and/or be given a structuring embossing. Preferably the decoration and/or the structuring embossing are the same as the pattern located on the surface.

It is noted that the foregoing examples have been provided merely for the purpose of explanation and are in no way to be construed as limiting of the present invention. While the present invention has been described with reference to an exemplary embodiment, it is understood that the words which It is claimed:

1. A building board comprising a top side, an underside and side edges, a polyurethane layer applied at least on the top side, a decorative layer imitating a natural material applied onto the polyurethane layer, and a polyurethane applied onto the underside, wherein the polyurethane layer contains particles heavier than the polyurethane applied onto the underside.

2. The building board according to claim 1, wherein the decorative layer is composed of one or more layers.

3. The building board according to claim 1, further comprising at least one sealing polyurethane layer sealing the decorative layer.

4. The building board according to claim 3, wherein the sealing polyurethane layer has a structural embossing.

5. The building board according to claim 4, wherein the sealing polyurethane layer is in a quantity of about 50 to 400 g/m$^2$.

6. The building board according to claim 5, wherein the sealing polyurethane layer is in a quantity of about 50 and 100 g/m$^2$.

7. The building board according to claim 3, further comprising metals or colored pigments embedded in the sealing polyurethane layer as effect-producing particles.

8. The building board according to claim 3, further comprising optical brightening agents in the sealing polyurethane layer.

9. The building board according to claim 3, further comprising particles with an antistatic effect in the sealing polyurethane layer.

10. The building board according to claim 3, further comprising constituents with an antibacterial effect in the sealing polyurethane layer.

11. The building board according to claim 3, further comprising dirt-repellent constituents in the sealing polyurethane layer.

12. The building board according to claim 1, further comprising a decorative layer imitating a natural material on to the side edges.

13. The building board according to claim 12, wherein the decorative layer includes a structuring embossing imitating a natural material.

14. The building board according to claim 1, wherein the building board is one of wooden, plastic and a mixture of wooden material and plastic.

15. The building board according to claim 1, wherein the decorative layer imitating a natural material is applied directly onto the polyurethane layer such that the decorative layer and the polyurethane layer are in contact and placed in an order of the polyurethane layer and the decorative layer from bottom to top.

16. A building board comprising a top side, an underside and side edges, a polyurethane layer applied at least on the top side, a decorative layer imitating a natural material applied onto the polyurethane layer, and a polyurethane layer on the underside which contains colored particles.

17. A building board comprising a top side, an underside and side edges, a polyurethane layer applied at least on the top side, a decorative layer imitating a natural material applied onto the polyurethane layer, at least one sealing polyurethane layer sealing the decorative layer and corundum particles embedded in the sealing polyurethane layer.

18. A building board comprising a top side, an underside and side edges, a polyurethane layer applied at least on the top side, a decorative layer imitating a natural material applied onto the polyurethane layer, and a polyurethane layer applied onto the underside, wherein the polyurethane layer contains sand, flour or dusts of quartz, granite or marble or metal particles.

19. The building board according to claim 18, wherein the polyurethane layer on the underside contains colored particles.

* * * * *